March 29, 1960
C. H. McALPINE ET AL
2,930,508
MACHINE FOR SUCCESSIVELY DELIVERING STACKED PANELS
Filed Jan. 19, 1955
7 Sheets-Sheet 4
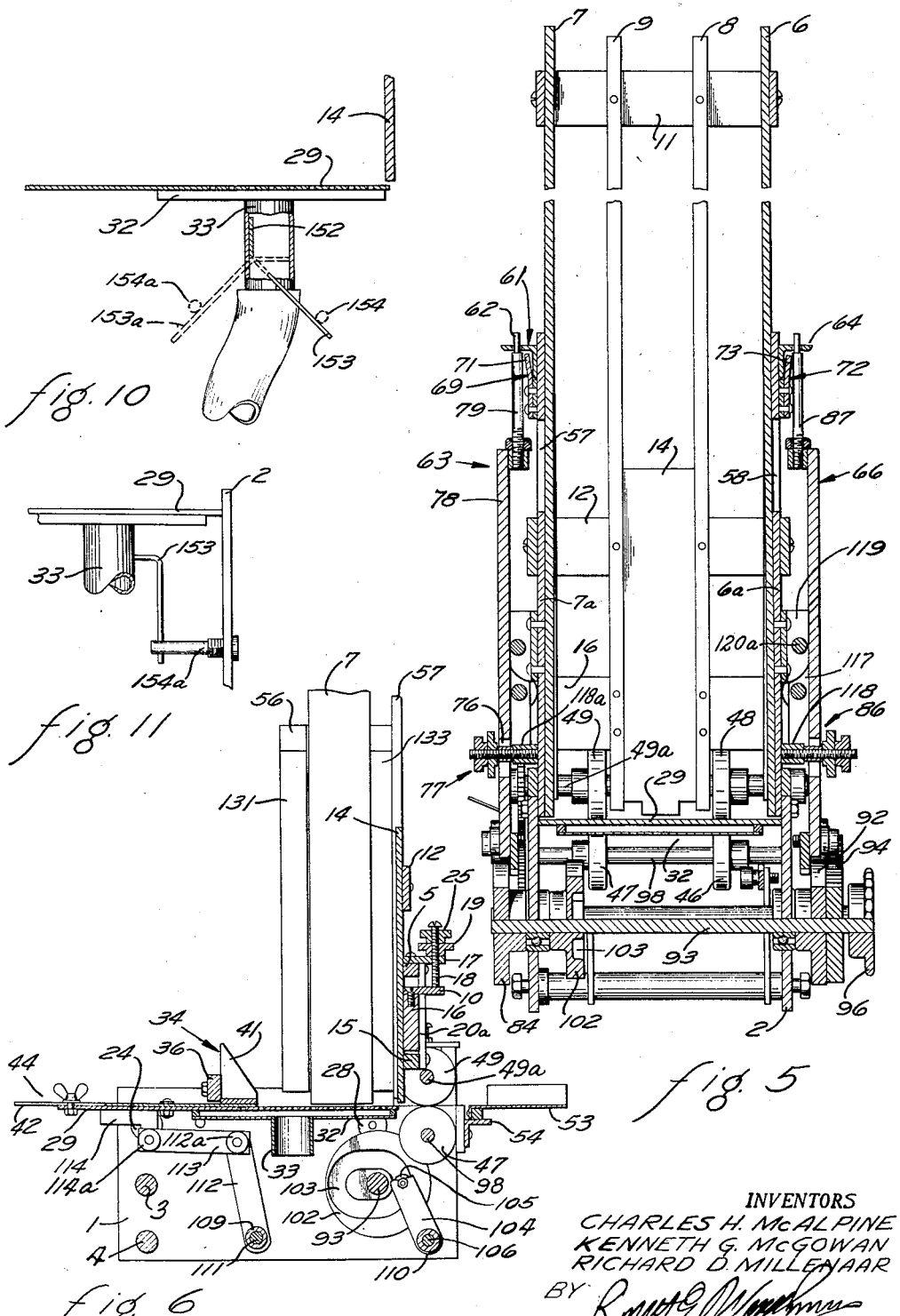
INVENTORS
CHARLES H. McALPINE
KENNETH G. McGOWAN
RICHARD D. MILLENAAR
BY
ATTORNEY March 29, 1960 C. H. McALPINE ET AL 2,930,508
MACHINE FOR SUCCESSIVELY DELIVERING STACKED PANELS
Filed Jan. 19, 1955 7 Sheets-Sheet 5

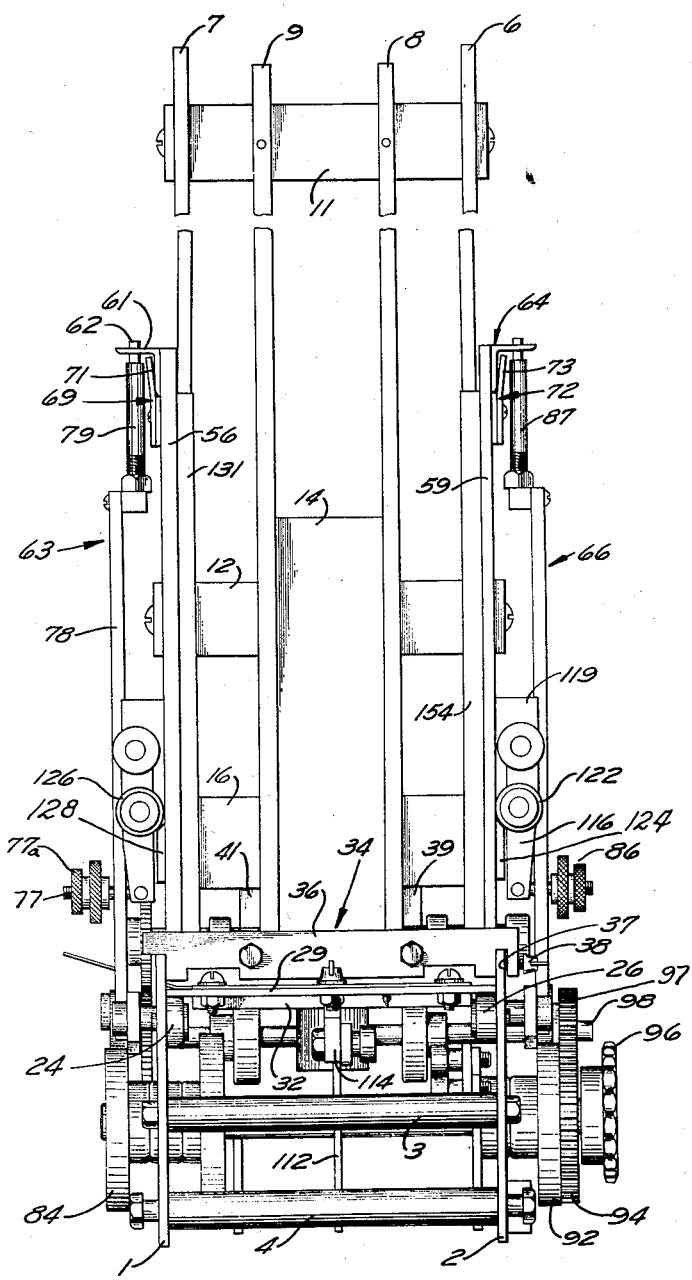

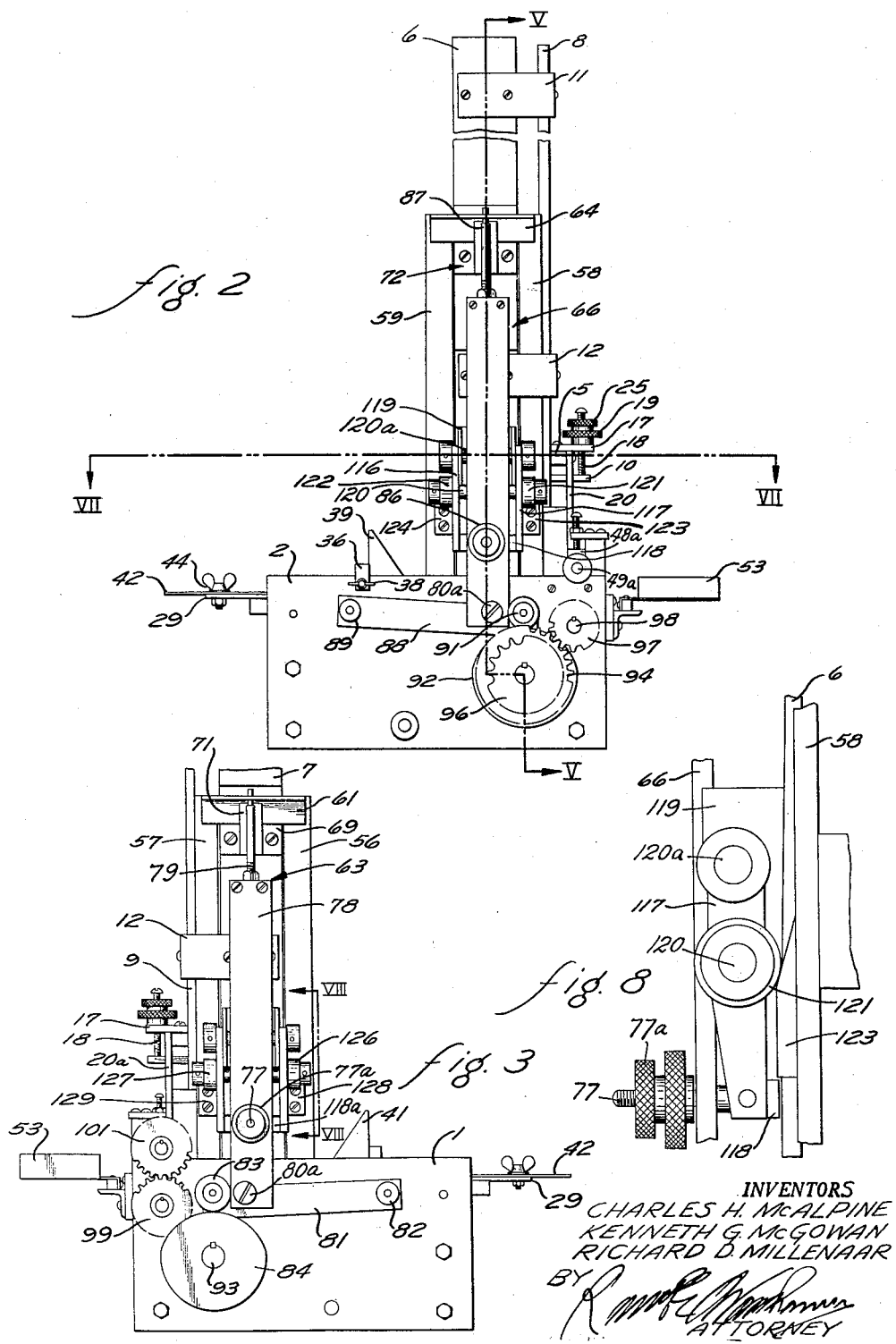

INVENTORS
CHARLES H. McALPINE
KENNETH G. McGOWAN
RICHARD D. MILLENAAR
BY
ATTORNEY

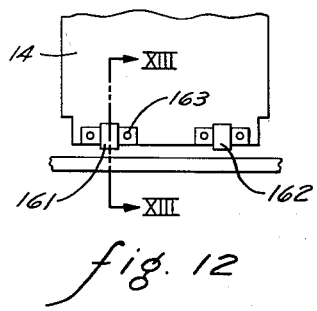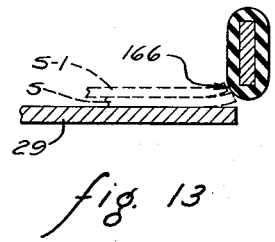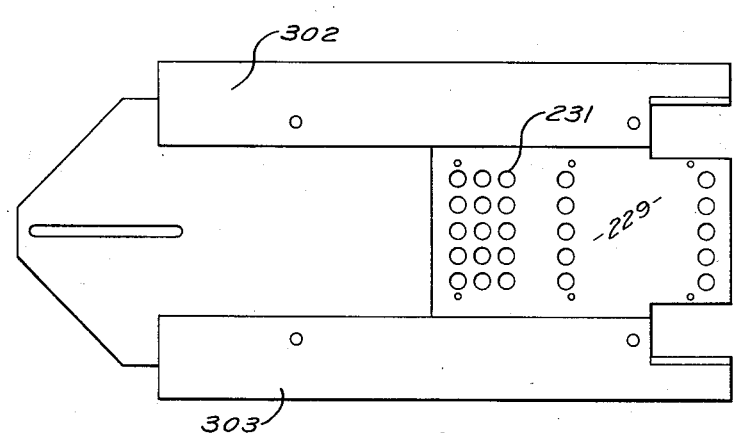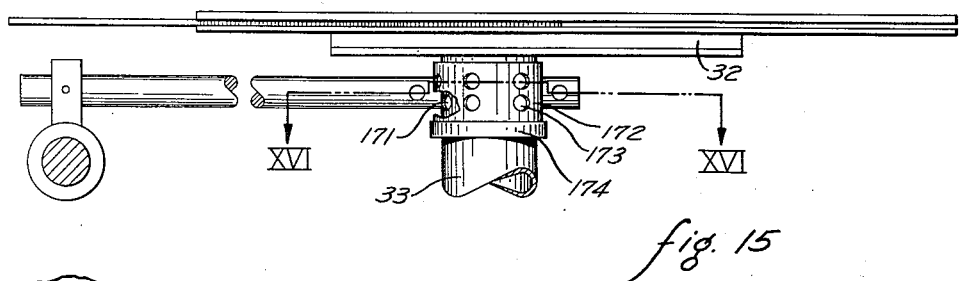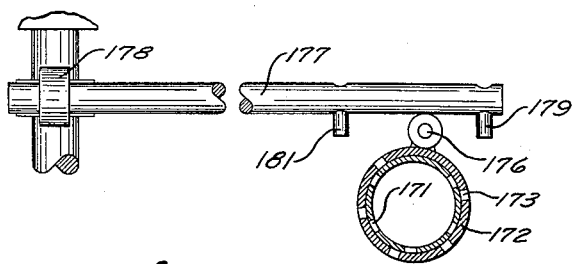

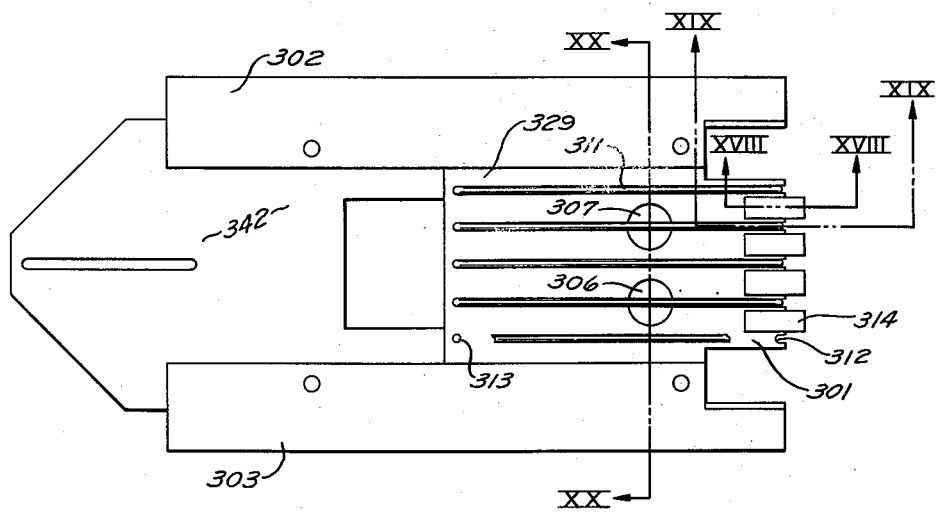
fig. 17
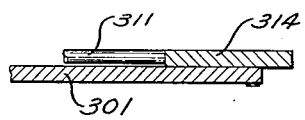
fig. 18
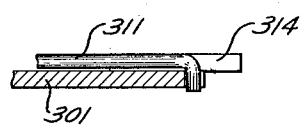
fig. 19
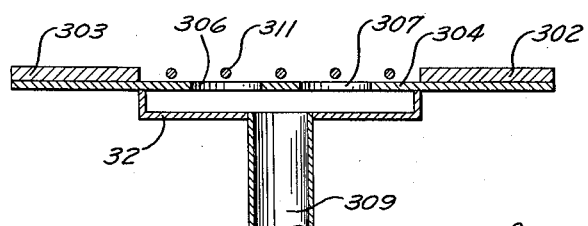
fig. 20

United States Patent Office 2,930,508
Patented Mar. 29, 1960

2,930,508

MACHINE FOR SUCCESSIVELY DELIVERING STACKED PANELS

Charles H. McAlpine, Coloma, and Kenneth G. McGowan, Lawrence, Mich., and Richard D. Millenaar, Oak Park, Ill., assignors to Winkel Machine Company, Watervliet, Mich., a corporation of Michigan Application January 19, 1955, Serial No. 482,716

6 Claims. (Cl. 221—221)

This invention relates to a stacking machine for moving small panels from a stack successively to a point spaced substantially horizontally from the position of said stack and it relates more particularly to a device for moving small panels from the bottom of a stack thereof, one at a time, horizontally to other means, as a conveyor belt, for either further processing or for conveying to a point of further processing.

In the manufacture of storage batteries, it has long been a problem in the art to provide mechanical means for assembling cell units from stacks of positive and negative grid panels and stacks of separators. This has normally been carried out by hand inasmuch as machines, presently known, insofar as we are aware, have been incapable of meeting the wide variety of physical characteristics of the parts to be handled, particularly the separators.

In present battery making practice, the separators are made from a wide variety of materials, including relatively stiff fiber, relatively flexible wood (usually moist), fiber glass, combinations of fiber glass and other types of fiber, and many other materials all of which present a wide variety of degrees of stiffness, permeability, durability and other physical characteristics.

Accordingly, the principal object of the invention has been to provide a machine for moving a plurality of stacked panels, one at a time, from a first position to a second position horizontally spaced from said first position.

A further object of the invention has been to provide a device as aforesaid, which is particularly applicable for moving said panels in units of one panel each.

A further object of the invention has been to provide a machine which will be universally applicable to panels having a wide range of physical characteristics, particularly referring to their stiffness, permeability, durability and resistance to abrasion.

A further object of the invention has been to provide a device, as aforesaid, which will be positive in its operation and therefore fully reliable.

A further object of the invention has been to provide a device as aforesaid, which will be free from the necessity of delicate adjustments and therefore will be further capable of reliable operation.

A further object of the invention has been to provide a device as aforesaid, which will be sturdy and which when once adjusted for a given type of small panel will remain in effective adjustment over long periods of operation.

A further object of the invention has been to provide a device as aforesaid and which will require relatively little maintenance and wherein such maintenance as is required will be easy to effect.

A further object of the invention is to provide a device as aforesaid, which will feed the panels from the bottom of a stack thereof, in part by positive vacuum engagement therewith.

A further object of the invention has been to provide a device as aforesaid which when so desired will lift all, or most, of the stack above the panel, or group of panels, being moved at a given time sufficiently to release the weight otherwise bearing thereon in order to avoid the possibility of damage to said panels by scraping therebetween.

A further object of the invention has been to provide a device as aforesaid and which can receive a large number of panels at a given time and will treat them effectively and reliably.

A further object of the invention has been to provide a device as aforesaid and which can be timed in accurate cooperation with other related machinery.

Other objects and purposes of the invention will be apparent to persons acquainted with apparatus of this general type upon reading the following specification and inspection of the accompanying drawings.

In the figures:

Figure 1 is a rear view of a machine embodying the invention, showing the machine as viewed by an operator.

Figure 2 is a side view of said machine taken from the right side of Figure 1.

Figure 3 is a side view of the machine taken from the left side of Figure 1.

Figure 5 is a section taken on the line V—V of Figure 2.

Figure 6 is a section taken on the line VI—VI of Figure 4.

Figure 8 is a detail taken on an enlarged scale of the portion indicated by the lines VIII—VIII of Figure 3.

Figure 10 is a partially schematic view of a modified structure for the vacuum line.

Figure 11 is a view of the modification of Figure 10 taken from the leftward side of the structure shown in Figure 10 and including a side wall of the frame structure.

Figure 12 is a fragmentary view of the lower end of a modified form of the stripper portion of the apparatus.

Figure 13 is a section taken on the line XIII—XIII of Figure 12.

Figure 14 is a plan view of a modified structure of the platform and shuttle adapted particularly to the handling of separators.

Figure 15 is a side view of the mechanism shown in Figure 14 and also shows a modified structure of the vacuum line.

Figure 16 is a partial section taken on the line XVI—XVI of Figure 15.

Figure 17 is a plan view of a further modification of the platform and the shuttle particularly adapted for handling battery plates.

Figure 18 is a section taken on the line XVIII—XVIII of Figure 17.

Figure 19 is a section taken on the line XIX—XIX of Figure 17.

Figure 20 is a section taken on the line XX—XX of Figure 17.

*In general*

Figure 4:
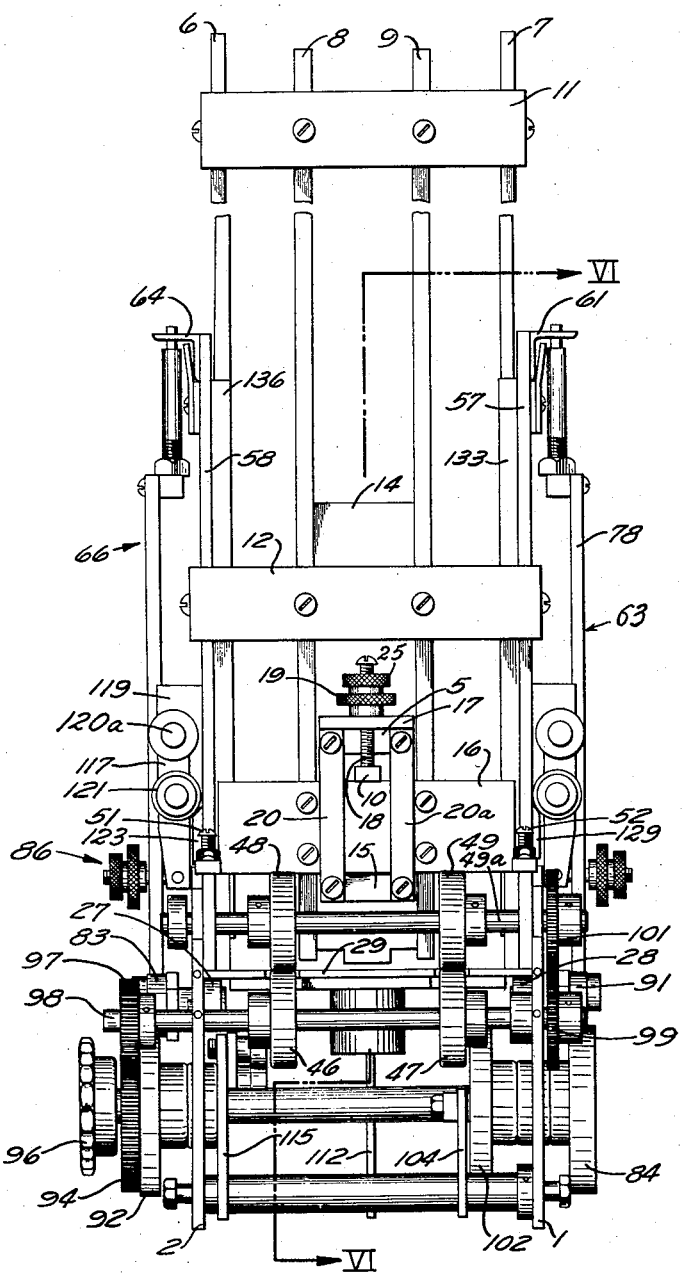
Figure 4 is a front view of the machine.

In meeting the objects and purposes above set forth, we have provided a perforated platform and means supporting and actuating same for reciprocable movement in a generally horizontal plane from a first position, the position occupied by a stack from which panels are to be fed, to a second position, the position at which a single panel being separated from the bottom of said stack is engaged by other means for further handling. Said platform has a vacuum applied to the lower side thereof for firmly holding the lower panel of each stack thereto by which said panel is held flat against said platform and thereby moves under whatever stripper means is provided for holding the rest of the stack against movement without striking of said panel against said stripper. Other means are provided alongside of the stack for engaging the major portion thereof and lifting it simultaneously with horizontal movement of said platform sufficiently to move at least the greater part of its weight from said lower panel and thereby permit said lower panel to move in response to movement of the platform freely, easily and without undesirable scraping or abrasion between it and the next higher panel of said stack.

In the discussion thus far, as well as in that following, it has been assumed that only a single panel will be moved at a time from the bottom of said stack and such is the normal operation of the machine. However, it will be recognized that in some circumstances it may be desirable to move said panels in units of two or more and that with panels of proper permeability and with proper adjustment of the controlling features of the machine this may be accomplished.

Accordingly, it should be understood that the assumption that only a single panel will be moved at a time by said machine is for illustrative purposes only, and while it represents the normal use of the machine, it is not intended to preclude the possibility of operating the machine to move more panels at a time if such should be desired.

Detailed description

Throughout the following description certain terminology will be employed for convenience in reference and it is to be understood that such terminology is for convenience only and has no limiting significance. For example, the terms "rightward" and "leftward" and derivatives thereof, will be used freely to refer to sides of the machine and these terms will refer to the machine as shown from the view of the operator which is the view of the machine presented in Figure 1. The terms "forward" and "rearward," and derivatives thereof, will refer to the end of the machine, respectively, toward which the material feeds and from which the material feeds, that is, the side of the machine shown in Figure 1 will be termed the rearward side of the machine and the side shown in Figure 4 will be termed the forward side of the machine. The terms "upward" and "downward" or "above" and "below," and derivatives of any thereof, will refer to the machine in its normal position of operation, as shown in Figures 1 to 6, inclusive. The terms "outward" or "inward" and derivatives thereof, will refer to directions toward or away from the geometric center of the machine.

The means for fastening the parts of the machine together, may be any of any normally employed procedures for this purpose, such as welding, bolting, screwing, excepting as otherwise expressly stated.

All shafts and other rotatable, oscillatable or pivotal parts of the machine will be assumed to be mounted in any convenient type of bearing, ball, roller or journal, of any conventional sort, without being expressly so stated other than to state that the part is mounted for rotation, oscillation or pivoting or such other movement as may be concerned in a given instance. Likewise, sliding parts may be provided with suitable anti-friction material and will be assumed to be so provided if called for by normal design requirements in a given instance without express mention of it other than that parts are mounted for sliding relationship with respect to each other.

Referring now to the drawings in detail, there is provided a frame consisting essentially of a pair of side plates 1 and 2 held together by a plurality of substantially horizontal spacers of which two are shown at 3 and 4. A pair of vertically upstanding guide members 6 and 7 are provided with reinforcing plates 6a and 7a, respectively, and extend upwardly from the side plates 2 and 1, respectively, to which they are mounted in any convenient manner, as by bolting.

The forward limit members 8 and 9 are provided on the front side of the machine to limit forward movement of the stack as indicated further hereinafter. Said forward limit members are mounted fixedly with respect to the guiding members 6 and 7 by straps 11 and 12.

The stripper 14 is positioned between the forward limit members 8 and 9 and extends to a point, as best shown in Figures 5 and 6, close to the plane defined by the upper surface of the hereinafter described supporting platform 29. A barrier 16 is held by suitable screws on and by the vertical forward limit members 8 and 9. A forwardly extending plate 10 is attached to the upper edge of the barrier 16 for reasons appearing hereinafter. An upper cross bar 5 is attached to the stripper 14 and a lower cross bar 15 is also attached to the stripper 14 and spaced downwardly from the cross bar 5. A pair of vertical straps 20 and 20a extend between and connect the cross-bars 5 and 15. The cross-bars 5 and 15 in cooperation with the straps 20 and 20a provide vertical guidance for the vertically sliding movement of the stripper 14 and also provide both top and bottom limits thereto. A plate 17 is supported on the upper cross-bar 5 parallel and spaced upwardly from the plate 10 and supports a screw 18 therein, the lower end of which screw bears against the upper side of the plate 10. Suitable lock nuts 19 and 25 are provided for holding the screw 18 in an adjusted position.

It will be apparent that rotation of the screw 18 will determine the vertical positioning of the member 17 and thereby determine the vertical positioning of the stripper 14 and the same may be locked in a selected position by the lock nuts 25 and 19.

A pair of rollers 24 and 26 (Figure 1) are rotatably supported upon the opposing surfaces of the side plates 1 and 2, respectively, near the rearward side of the frame structure and a pair of similar rollers 27 and 28 are similarly mounted on the side plates 1 and 2 near the forward side thereof for the support of the horizontally movable platform 29. Said platform is provided with a plurality of perforations 31 therethrough in the forward portion thereof. A manifold 32 (Figures 1, 5 and 6) is provided under the forward portion of said platform and is connectible by a conduit 33 (Figure 6) to any suitable source of vacuum, not shown.

A rear barrier 34 is mounted above platform 29 and consists of a cross-bar 36 extending between the plates 1 and 2 and provided with a notch 37 (Figure 1) for engaging one of said plates. A suitable means, as a bolt 38 (Figure 2) having a winged head, is threadedly received lengthwise through the end of said bar 36 and into the notch 37 for engaging the side plate 2 and thereby affixing said rear barrier firmly in place. A pair of barrier guides 39 and 41 are affixed to the cross-bar 36. Said guides are preferably angled as shown to assist in guiding a newly inserted stack into place. The shuttle 42, which is supported on and moves with the platform 29, has lengthwise slots 43, 44 and 45 therein. Screws 43a, 44a, and 45a are slidably received through the slots 43, 44 and 45, respectively, for the purpose of threadedly engaging the platform 29 and adjustably fastening said shuttle 42 to said platform. The shuttle 42 extends under the rear barrier assembly 34 but in close sliding engagement therewith.

Figure 7:
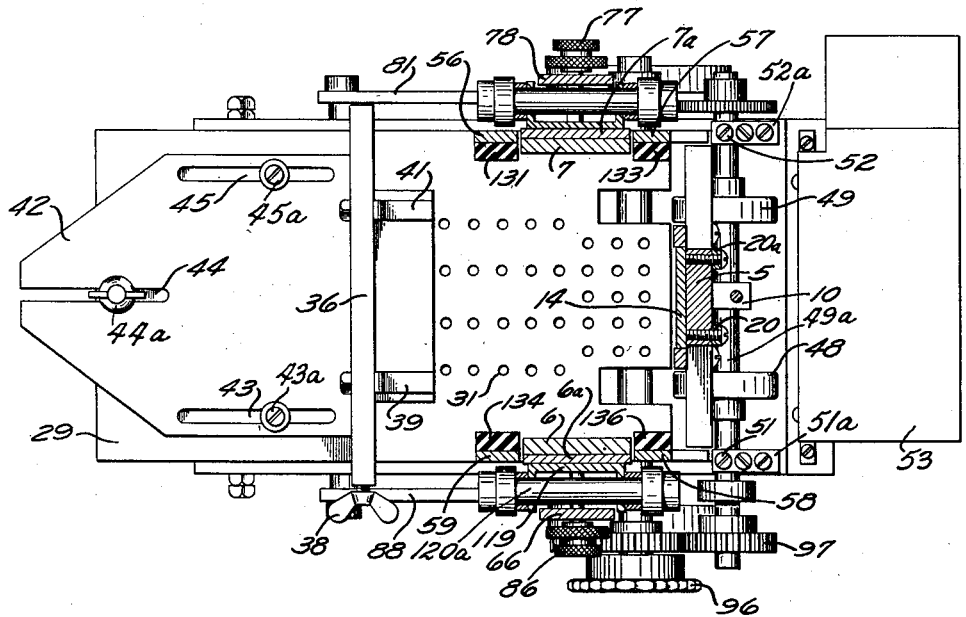
Figure 7 is a section taken on the line VII—VII of Figure 2.

A pair of lower discharge rollers 46 and 47 are fixedly attached to the shaft 98 which is rotatably supported by and between the side members 1 and 2 near the forward end of the machine (Figures 4, 5 and 6) and an upper pair of rollers 48 and 49 (Figures 4, 5 and 7) are fixedly attached to the shaft 49a which is rotatively supported on suitable brackets 51a and 52a (Figure 7) immediately above said side members 1 and 2, said rollers 48 and 49 being in radial alignment with the lower rollers 46 and 47. More specifically, the ends of shaft 49a are rotatably supported in blocks, one of which is shown at 48a in Figure 2, which are slidably held within the brackets 51a and 52a (Figure 7) for vertical adjustment by the screws 51 and 52. The peripheries of said radially aligned rollers are in close association with each other and the exact spacing of the upper rollers from the lower rollers is controlled by any convenient means, including the screws 51 and 52 (Figures 4 and 7). The horizontal tangent to the lower rollers 46 and 47 lies substantially in the plane defined by the upper surface of the plate 29 (Figure 6).

Any convenient receiving means may be provided for receiving panels discharged from the device, as the platform 53 supported on an angle 54 which in turn is supported across the front of the plates 1 and 2.

A pair of vertically sliding lifting members 56 and 57 (Figures 3 and 7) are provided on either side of the upstanding member 7 and a similar pair of lifting members 58 and 59 (Figures 2 and 7) are provided on either side of the upstanding member 6. The lifting members 56 and 57 are connected by the angle member 61 whose horizontal flange is perforated to receive the upper end 62 of the pin 79 on the vertical pusher 63 (Figure 1). A similar angle member 64 is provided on the lifting members 58 and 59 and the horizontal flange thereof receives the upper end of the pin 87 on the vertical pusher 66. A cradle structure 69 is affixed to the upstanding member 7 and has an upwardly extending flange 71 (Figure 5) for engaging the vertical flange of the angle member 61. A similar cradle 72 is supported on the upstanding member 6 and has a vertical flange 73 for engaging the downwardly extending flange of the angle member 64. The cradle 69, by engaging the angle member 61, limits downward movement of the lifting members 56 and 57 with respect to the member 7, and the cradle 72 serves as a similar purpose with respect to the lifting members 58 and 59.

It will be observed that the strap 12 extends around the lifting members 57 and 58 and, accordingly, provides a guide for the vertical reciprocation of said members. The reinforcing plate 6a and 7a, which are secured to the members 6 and 7, respectively, aid in guiding the vertical movement of the lifting members 56 and 59, inclusive.

The bar 78 of vertical pusher 63 is provided with a vertically elongated slot 76 (Figure 5) through which extends a guiding stud 77, which is connected to the guide plate 7a on the vertically upstanding member 7 and is threadedly engaged by the block 118a. The stud 77 functions to hold said pusher 63 in proper position with respect to the rest of the apparatus and hold its vertical motion within the desired line of reciprocation. The knurled elements 77a on the stud 77 are utilized to adjust the position of the block 118 with respect to the guide plate 7a. It will also be noted that the vertical pusher 63 includes an adjustable pin 79, said pin 79 being vertically adjustable with respect to the bar 78. In this manner, proper adjustment may be made of the parts for controlling the exact positioning of the lifting members with respect to the rest of the machine.

The member 78 of the vertical pusher 63 is pivotally attached at its lower end by pin 80 to a lever 81 (Figure 3) which lever is pivotally supported at its rearward end by pin 82 upon the side plate 1. A cam follower 83 is rotatably carried by the lever 81 at its forward end and engages the cam 84. Thus, vertical movement of said cam follower 83 in response to rotation of the cam 84 results in limited, accurately and closely controllable movement of the vertical pusher 63.

The pusher 66 on the other side of the machine is likewise fitted with a vertical guide stud 86 (Figure 1), corresponding in structure and function with the vertical guide stud 77, and is provided with a vertically adjustable pin 87 for the precise vertical positioning of the guiding members 58 and 59. The vertical pusher 66 is pivotally attached at its lower end by pin 80a to a lever 88 (Figure 2) which is pivoted by pin 89 upon the side plate 2. A cam follower 91 is rotatably carried on the front end of the lever 88 and engages the cam 92 (Figure 5) in the same manner as the cam follower 83 follows the cam 84.

The cams 84 and 92 are fixedly mounted on a shaft 93 which is driven by a sprocket 96 from any suitable source of power, not shown. A gear 94 fixedly mounted also on the shaft 93 is provided for driving the gear 97 which in turn is fixedly attached to and drives the shaft 98 and the lower rollers 46 and 47. The shaft 98 also carries a gear 99 which is fixedly attached to and drives a gear 101 (Figure 4) by which the rollers 48 and 49 are driven in positive relationship with the rollers 46 and 47.

Figure 9:
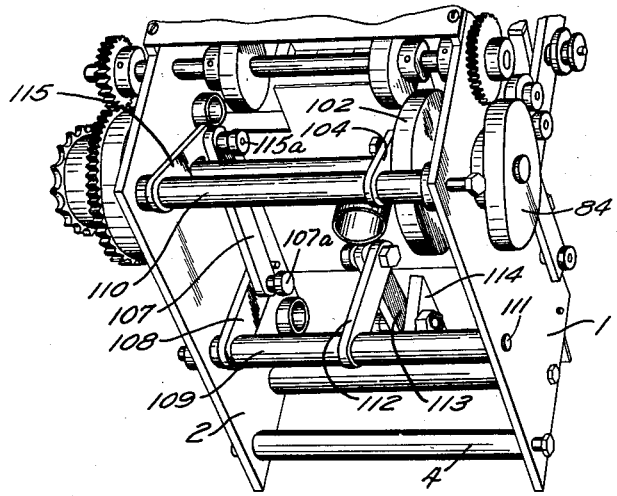
Figure 9 is an oblique view of the underside of the machine showing a portion of the operating mechanism.

The shaft 93 also fixedly carries a cam 102 (Figures 6 and 9) having a channel 103 therein. A cam follower 105 positioned within said channel is located on the upper end of the lever 104 (Figures 6 and 9) and is fixed to a sleeve 110 which is rotatably mounted on the rod 106 (Figure 6). Said sleeve 110 is fixedly attached to another lever 115, which latter lever is pivotally attached by pin 115a to one end portion of the link 107. The other end portion of link 107 is pivotally attached by pin 107a to the lever 108 which is fastened to a sleeve 109 which sleeve is mounted pivotally on a rod 111. A lever 112 is affixed rigidly to the sleeve 109 and it is pivotally connected by pin 112a to a link 113, which is pivotally connected by pin 114a to a bracket 114 rigidly mounted to the under side of the platform 29. Thus, rotation of the cam 102 effects reciprocation of the platform 29 in a sequence positively controlled with respect to the other part of the machine and under the immediate control of the channel 103 in the cam 102.

A pair of straps 116 (Figure 1) and 117 (Figures 2 and 8) are affixed at their respective lower ends to the block 118 (Figures 5 and 8) and are pivotally mounted at their respective upper ends to the flanges of the channel member 119 by means of the shaft 120a, said channel member 119 being affixed (Figure 5) to the upstanding member 6a. A pair of rollers 121 and 122 are affixed on a suitable shaft 120 supported by said straps and bear, respectively, against the vertical lifting members 58 and 59. The cams 123 and 124 (Figure 2) are affixed to said vertical lifting members to effect their movement inwardly as said vertical lifting members are lifted in such a manner that said cams pass said rollers. Similar structure is provided on the other side of the machine for supporting rollers 126 and 127 (Figure 3) with respect to the vertical members 56 and 57 and the cams 128 and 129 are supported on said last named vertical guiding members for cooperation with said last named rollers by which to move said vertical guiding members 56 and 57 inwardly simultaneously with upward movement therewith.

If desired, and it is preferable, strips of resilient materials, as sponge rubber, may be applied to the mutually facing surfaces of the vertical lifting members as well, said strips being indicated at 131, 133, 134 and 136, in Figure 7.

*Operation*

In preparing the device for operation, and assuming the apparatus to be adjusted for proper timed relationship between its several parts, it is necessary only to place a stack of panels, as battery cell plates, on the platform 29 in the space defined between the rubber strips 131, 133, 134 and 136 and the upstanding guide members 7 and 6, respectively, and the forward members 8 and 9 and the rearward barrier 34. Vacuum is applied to the conduit 33 and rotation from any convenient source is applied to the sprocket 96. Rotation of the cams 84 and 92, resulting from rotation of the sprocket 96, will first effect a lifting of the rollers 91 and 83 and thereby lift the vertical pushers 78 and 66. This acts through the angle members 61 and 64 to lift the vertical lifting members a distance determined by the shape of the cams 84 and 92. As said vertical lifting members 56, 57, 58 and 59 are lifted, their respective cams 128, 129, 123 and 124 pass under the rollers 126, 127, 121 and 122, respectively, and the lower ends of said vertical lifting members are moved inwardly. This effects a gripping of a majority of the stack and the lifting thereof upwardly sufficiently to take all or most of the weight off from the one or ones remaining supported on the platform. Immediately following this action, the cam 102 acting through the linkage above mentioned in connection therewith effects a forward movement of platform 29 which in turn effects a forward movement of the shuttle 42. Said shuttle 42 acts against the edge of the plate (or plates where more than one plate is being moved in a single cycle) which is to be moved in a given cycle and carries it out from under the stack and past the lower end of the stripper 14. Immediately after the plate passes said stripper, it enters the nip of the rollers 47 and 49 adjacent its one edge and the rollers 46 and 48 adjacent its other edge. Said rollers then grip the plate and draw it rapidly off the platform 29 and discharge it onto the receiver 53. As soon as the rollers engage the plate, further action of the cam 102 starts the platform rearwardly toward its initial position. After the platform 29 has returned to its initial position, further action of the cams 84 and 92 permit the vertical lifting members to move downwardly and the said lifting members are also permitted to move away from each other, or outwardly, by the separation of the cams 128, 129, 123, and 124 from the rollers 126, 127, 121 and 122. Thus, the stack is released from the lifting members and is permitted to move downwardly sufficiently to supply another plate to the surface of the platform 29 and the cycle is ready to repeat.

Where the feeder of the invention is used to feed relatively flimsy panels, as the moist wooden separators used in the manufacture of some kinds of storage batteries, the lifting mechanism including the vertical lifting members 56, 57, 58 and 59 will normally not be employed inasmuch as the weight thereof is not normally a serious factor. Actually, such weight as there is present is more often desirable in holding the lowermost separator flat against platform 29. However, the problem to be met here is the problem of the curling or bending of the separators which, when it exists, will often cause the separator which is to be moved onto the receiver 53 to strike against the stripper 14 and thereby prevent the proper working of the apparatus. Thus, the vacuum provided by the conduit will be utilized for this purpose. Such vacuum will hold even a moist and flimsy separator firmly against the upper surface of said platform and this permits the shuttle 42 to act against the edge thereof and carry it out from under the stack and safely past the lower end of the stripper 14. Thus, even where the separators tend to curl under the full weight of the stack, the stiffness applied to said bottom separator by the vacuum appearing within the manifold 32 enables the pusher 42 to act thereagainst and move it quickly and efficiently from under said stack and into the nip of the respective rollers 47 and 49 on one side and 46 and 48 on the other side of the machine. Said rollers then grip the separator and draw it rapidly off from the platform 29 and discharge it onto the receiver 53. As soon as the rollers engage the separator, further action of the cam 102 starts the platform 29 rearwardly toward its initial position. As soon as the platform is returned to its initial position, the cycle is ready to repeat.

*Modifications*

While the foregoing described device has been shown with a constantly open vacuum line 33, it will be recognized that under some circumstances as when flimsy separators are handled, a valve may be provided by which the vacuum line is automatically opened and closed in synchronism with the reciprocation of the platform 29. One arrangement is indicated somewhat schematically in Figures 10 and 11. Here there is placed pivotally mounted valve 152 provided immediately below the manifold 32. This valve is operated by a crank arm 153 (only partially indicated in Figure 10), which is actuated by a pair of pins 154a and 154b, mounted on the side plate 2 as they reciprocate forwardly and rearwardly with the platform 29. Thus, with the platform in the rearward position, the crank arm 153 is in the position shown in the solid lines in Figure 10. As the platform 29 moves forwardly, the crank arm 153 strikes the pin 154b and causes the valve to close. In this manner the vacuum line is protected from the entry of atmospheric pressure when the panel is drawn off the platform 29 by the rollers. With the platform in its forward position, the crank arm is in the position indicated by the broken lines 153a (Figure 10). As the platform then returns to its rearward position the valve is returned to the solid line position by any convenient means, such as the pin 154a. In this position it is again ready to admit vacuum to the chamber 32.

In some instances where particularly flimsy panels, as separators, are being handled, and where the source of vacuum is such that no material damage will be done thereto by temporarily permitting air to enter freely thereinto, the structure shown in Figures 14, 15 and 16 may be desirable. Referring first to Figure 14, the platform, here designated as 229, is shown with a plurality of large openings 231 therein, sufficient to operate against the entire surface of the separator and insure its lying flat against the upper surface of the platform 229. However, with such flimsy separators some difficulty may be experienced in pushing a separator off the platform as desired unless means are provided for releasing such separator from the effect of the vacuum applied thereto. This may be supplied by the provision of a plurality of openings, one of which is indicated at 171, in the vacuum line 33 immediately below the manifold 32. A valve ring 172 is then placed around the vacuum line 33 and said valve ring is in turn supplied with a plurality of openings 173. A collar 174 is placed around the vacuum line 33 and held in position by a suitable set screw, not shown, for holding the valve ring 172 in place. Said valve ring has a lug 176 affixed thereto for acting thereon in the manner of a crank and effecting rotation thereof. A bar 177 is positioned by a suitable bracket 178 in any convenient manner on the frame of the apparatus and positioned so that the pins 179 and 181 will strike the lug 176 as the platform 229 moves forwardly and rearwardly.

Thus, when the platform is in its rearward position, the valve ring 172 is so placed that openings in said valve ring and those in the vacuum line 33 are out of alignment and the vacuum is applied through the openings 231 to hold the separator tightly against the platform 229. After the platform 229 is moved forwardly in the same manner as above described in connection with other embodiments of the apparatus so that the separator is engaged by the rollers 47 and 49 on the one side thereof and 46 and 48 on the other side thereof, the lug 176 will strike the pin 179 to rotate the ring 172 and bring the openings in said ring and said vacuum line into alignment. This admits air directly into the vacuum line and releases the vacuum from the separator and thereby permits the separator to be drawn easily and quickly off the platform 229 by said rollers and discharged onto the receiver 53. Said platform 229 then returns in the usual manner to its rearward position for repeating the cycle and as it does so the lug 176 strikes the pin 181 and the valve 172 is again closed thereby to apply vacuum through the openings 231 to the next separator.

For some types of operation, particularly where separators are being handled which tend to curl, it will be found desirable to use, either instead of or in addition to, the vacuum above-described, the further guiding means indicated in Figures 12 and 13. Here is shown the lower end of the stripper member 14 provided with a plurality of resilient guides 161 and 162. These guides are mounted on the lower end of the stripper in any convenient manner, as by being received onto mounting bars 163 and 164 which in turn are fastened in any convenient manner, as by bolting, to the lower edge of the stripper 14. Said guides 161 and 162 are of relatively soft, and resilient, material, such as rubber, and are provided with a smoothly rounding lower edge 166. Thus, as a separator, indicated in Figure 13 in broken lines at "S" which is upwardly curved at its leading edge, approaches said stripper, the guides will urge said separator downwardly into the proper position for passing under said stripper. The next separator above the separator "S" is also indicated in broken lines (Figure 13) by the designation "S1."

In some operations involving the handling of battery plates, it has been noted that even the most careful handling will sometimes cause small flecks of material to leave the interstices within the plates and remain on the platform. Such material then interferes with the next plate to be handled and may cause a dislodgement of still more of the battery paste material. While the dislodgement of such minor amounts of material is of no material disadvantage by itself, if no provision is made for the removal of this material, it may rapidly accumulate to a point where operation of the machine becomes unsatisfactory. Accordingly, the purpose of the modification illustrated in Figures 17, 18 and 19 is to provide for the rapid disposition of such material and to prevent its accumulation.

Now referring to Figure 17, there is provided a platform 329 corresponding to the platform 29 above described and a shuttle 342 corresponding to the shuttle 42, above described. Said shuttle lies above and against said platform in the same manner as the shuttle 42 lies above and against the platform 29.

Here the platform 329 comprises a base portion 301 flanked by a pair of side spacers 302 and 303, which define a dust gathering zone 304, and which may be of less width than one of said panels. Openings 306 and 307 are provided in the bottom of said dust gathering zone and communicate with a vacuum line 309 corresponding to the vacuum line 33 above described. A plurality of wire supports 311 extend longitudinally through the zone 304. The forward end of each of said wires is bent downwardly and received into a groove 312 at the forward end of the plate 301 and is fastened thereinto in any convenient manner, such as by welding. The rearward end of each of said wires is bent downwardly and is received into an opening 313 and is rigidly fastened therein in any convenient manner, as by welding. A plurality of spacers 314 are supported on the portion 301 between each of said wires as appearing in Figure 17. The whole arrangement is such that the upper edges of the wires are substantially flush with the upper surface of the side spacers 302 and 303, but below the upper surface of the shuttle 342.

The platform is received into the machine shown in Figures 1 to 11, inclusive, in the same manner as the platform 329 and operates therein in the same manner, with the additional function that any dust or particles which fall out of a given plate will be received into the chamber 304 and will be drawn through openings 306 and 307 into a suitable collector provided in association with vacuum line 309. Thus, accumulation of such dust and particles in a position to injure subsequent plates is effectively prevented.

While certain specific embodiments of the invention have been used herein for illustrative purposes, many variations within the scope of the invention will be recognized by those skilled in the art. Hence, the claims should be interpreted to include such variations excepting as they by their own terms expressly provide otherwise.

We claim:

1. In a machine for feeding panels successively from a stack to a substantially horizontally spaced location, the combination comprising: a frame; a platform supported on said frame for engaging the bottom surface of the lowest panel of said stack and means for reciprocating said platform in a generally horizontal plane to thereby move said lowest panel from said stack to said location: a plurality of substantially parallel elongated, upstanding plates supported on said frame, located above said platform and positioned adjacent and on respectively opposite sides of said stack; means supporting said plates for vertical sliding movement, said plates each having a surface facing the side of said stack; means supported on said frame for moving said upstanding plates vertically in synchronism with the movement of said platform; guide means supported on said frame and positioned adjacent the lower portion of each plate for moving said lower portions of said plates toward each other and thereby moving the lower portions of said surfaces into gripping engagement with opposite edges of the panels in said stack, except selected ones of said panels at the bottom of said stack, during upward, vertical movement of said plates said guide means maintaining said plates in substantially vertical position, means on said guide means for permitting the lower portions of said upstanding plates to move away from each other and out of engagement with the edges of said panels during downward, vertical movement of said upstanding plates.

2. The combination of claim 1, including a main drive shaft; a first cam drivingly connected to said drive shaft; linkage responsive to movement of said first cam for reciprocating said platform; a second cam drivingly connected to said drive shaft; and linkage, including a cam follower, responsive to movement of said second cam and connected to said upstanding plates for causing vertical movement thereof.

3. The combination of claim 1, including two pairs of elongated, upstanding plates, each pair being positioned on respectively opposite sides of said stack, the plates in each pair being spaced from each other in the direction of movement of said panels; a cam and cam follower means for each of said upstanding plates adjacent the surface thereof remote from said stack, one of said cams and cam follower means being fixed with respect to its upstanding plate and the other being affixed to said upstanding plate, the cams for said upstanding plates forcing said plates toward each other during their upward, vertical movement.

4. The combination of claim 1, including a layer of resilient and compressible material secured to the surface of said upstanding plates, said layer engaging the side edges of said panels when said stack is lifted.

5. A machine for feeding panels, comprising: a magazine assembly defining a rectangular stacking zone into which a stack of said panels may be received, said magazine assembly having a pair of opposing side structures, each of said side structures including a fixed upstanding guide member and a pair of substantially parallel, upstanding, vertically slidably movable lifting plates adjacent the respective vertical edges of said guide member, said plates having substantially flat surfaces facing each other; means securing the lifting plates in each side structure together; said magazine assembly having a stripper plate extending transverse to said side structures and limiting forward movement of all of said stack except a selected number of panels on the bottom thereof; a platform positioned below said magazine assembly for engaging the bottom surface of the lowest panel of said stack and means for reciprocating said platform in a generally horizontal plane to thereby move the lowest panel in said stack forwardly; means for moving said lifting plates vertically in synchronism with the movement of said platform; a pair of cam followers fixed to each of said guide members adjacent the lower end thereof and positioned, respectively, adjacent the outer surfaces of the lifting plates adjacent thereto; a cam secured to each of said lifting plates adjacent the lower end thereof, each of said cams having a downwardly and outwardly sloping surface engageable with one of said cam followers so that the lower portions of said lifting plates are moved by said cam followers inwardly of said magazine assembly toward each other and into gripping engagement with the respective side edges of the panels in said zone, except selected ones of said panels at the bottom of said stack, simultaneously with the upward movement of said lifting members and said lifting plates will be moved outwardly upon downward movement of said lifting plates.

6. In a machine for feeding relatively fragile panels, including plates and separators for storage batteries, from a stack to a position spaced substantially horizontally from the bottom of said stack, comprising in combination: means defining a stack receiving zone including a table, a forward wall limiting movement of said stack in the direction of said feeding and a pair of spaced side frames upstanding from the sides of said table for defining the sides of said zone, the lower end of said forward wall being spaced upwardly from the plane defined by the upper surface of said table a distance sufficient to permit one of said panels to pass from said table under said forward wall but insufficient to permit two thereof so to pass; a reciprocable pusher slidably mounted on said table and having a panel-engaging portion of thickness less than the thickness of a single panel and means timably reciprocating said pusher along the surface of said table toward and away from said forward wall; a pair of gripping devices, one thereof being arranged on each side of said table, supported for vertical reciprocation on and by said side frame members and normally defining a pair of spaced parallel planes respectively arranged on either side of said stack-receiving zone and spaced from each other a distance substantially equal to the width in the direction of said spacing of the stack of panels to be handled thereby, whereby to engage the opposite sides of a stack positioned on said table through a major portion of the vertical length thereof, the lower end of said gripping means terminating at a point spaced from said table a distance greater than the vertical thickness of one of said panels; cam and wedge means arranged between said side frames and said gripping devices respectively whereby vertical motion of said gripping devices with respect to said side frame members will move said gripping devices toward and away from each other, in an upward movement of said gripping devices the same moving first toward each other to grip a stack thereby and then upwardly to carry the majority of said stack upwardly and thereby relieve the weight of at least most of said stack from the bottom panel thereof; means effecting vertical reciprocable movement of said gripping devices; means effecting horizontal reciprocable movement of said pusher; and means coordinating the movement of both of said last-named means with each other to effect a forward movement of a said pusher when, and only when, said gripping devices are in an upward position; whereby feeding of the bottom panel from said stack will occur only when the weight of the majority of said stack is removed therefrom.

References Cited in the file of this patent

UNITED STATES PATENTS

| | | |
|---|---|---|
| 548,056 | Hewitt | Oct. 15, 1895 |
| 906,827 | Staude | Dec. 15, 1908 |
| 1,690,920 | Bergmann et al. | Nov. 6, 1928 |
| 1,904,198 | Brand | Apr. 18, 1933 |
| 2,629,503 | Neja | Feb. 24, 1953 |
| 2,637,451 | Newell | May 5, 1953 |
| 2,702,132 | Van Doren | Feb. 15, 1955 |
| 2,734,657 | Drese | Feb. 14, 1956 |
| 2,738,899 | Hansen | Mar. 20, 1956 |
| 2,769,570 | Adams | Nov. 6, 1956 |

FOREIGN PATENTS

| | | |
|---|---|---|
| 546,167 | Great Britain | June 30, 1942 |